(12) United States Patent
Srinivas et al.

(10) Patent No.: US 7,380,006 B2
(45) Date of Patent: May 27, 2008

(54) METHOD FOR AUTOMATIC TUNING OF TCP RECEIVE WINDOW BASED ON A DETERMINED BANDWIDTH

(75) Inventors: Nk Srinivas, Issaquah, WA (US); Art Shelest, Sammamish, WA (US); Peter S. Ford, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 09/736,988

(22) Filed: Dec. 14, 2000

(65) Prior Publication Data

US 2002/0112057 A1  Aug. 15, 2002

(51) Int. Cl.
*G06F 15/16* (2006.01)
*G06F 15/173* (2006.01)

(52) U.S. Cl. ............... 709/227; 709/217; 709/223; 709/226; 709/228; 709/235; 370/229; 370/235; 370/401

(58) Field of Classification Search ........ 709/201–203, 709/217–219, 227–228, 232–235, 223–224; 370/229–235, 252–254, 338, 349, 401, 466
See application file for complete search history.

(56) References Cited

U.S. PATENT DOCUMENTS

| | | | | |
|---|---|---|---|---|
| 6,046,979 A | * | 4/2000 | Bauman | ............... 370/229 |
| 6,473,793 B1 | * | 10/2002 | Dillon et al. | ............... 709/223 |
| 6,654,344 B1 | * | 11/2003 | Toporek et al. | ............ 370/230 |
| 6,711,137 B1 | * | 3/2004 | Klassen et al. | ............ 709/223 |
| 6,788,704 B1 | * | 9/2004 | Lindsay | ..................... 370/230 |
| 7,283,474 B1 | * | 10/2007 | Bergenwall | ................. 370/235 |

OTHER PUBLICATIONS

Jacobson, V., "Congestion Avoidance and Control," *Computer Communication Review* 18:4, Aug. 1988; pp. 314-329.
Stevens, W. R., *TCP/IP Illustrated vol. 1 The Protocols*, Chap. 20.3, 20.6 and 20.7, Addison-Wesley Publishing Company, Reading, Massachusetts, 1994; pp. 280-282; 285-292.
Semke et al., "Automatic TCP Buffer Tuning," *Proc of SIGCOMM '98*, Vancouver, B.C., Aug. 1998.
"Windows optimizations for broadband connections (RWIN)," downloaded from dslreports.com/tweaks, on Mar. 13, 2001, 5 pages.

* cited by examiner

*Primary Examiner*—Bharat Barot
(74) *Attorney, Agent, or Firm*—Merchant & Gould P.C.

(57) ABSTRACT

A method and system are directed at automatically tuning a TCP receive window (RWIN). The size of the RWIN may be determined by attributes of a network card. One attribute used to size the RWIN is the speed of the adapter card. The adapter speed is readily available by polling the network card. Once the speed is known, the size of the RWIN is selected from a table and is automatically set. Alternatively, the size of the RWIN may be determined by a formula.

20 Claims, 12 Drawing Sheets

METHOD FOR AUTOMATIC TUNING OF TCP RECEIVE WINDOW BASED ON A DETERMINED BANDWIDTH

FIELD OF THE INVENTION

The present invention relates generally to computer software, and more particularly tuning a TCP receive window.

BACKGROUND

At the heart of the Internet is the collection of networks and gateways that use the Transmission Control Protocol/Internet Protocol ("TCP/IP") suite of protocols to communicate with one another. Tuning the TCP/IP parameters, therefore, directly affects actual throughput speed of the pipe.

Many computing devices, however, are not properly tuned to take advantage of their connection speed to networks. Therefore, computers having high-speed connections may not be utilizing the existing bandwidth available to the fullest extent.

During the TCP/IP connection setup process a receiver advertises its TCP Receive Window (RWIN) size to a sender. The size of the RWIN affects how many packets may be sent before receiving an acknowledgment (ACK) indicating receipt of the packets. On a high bandwidth/high TCP connection, a sender may transmit a number of packets before the first packet ever reaches the receiver. Even if the receiver sent an ACK immediately, it takes some more time for the ACK to reach the sender. If a sender waits for an ACK before sending data the pipe will not remain full thereby decreasing pipe throughput. The sender, therefore, should not stall waiting for ACK. As a result, one of the most significant TCP/IP parameters to tune is the size of the RWIN.

Tuning the size of the RWIN, however, is not a trivial task. Improperly tuning the size of the RWIN results in decreasing throughput of the pipe, while properly tuning the size of the RWIN can dramatically increase throughput.

Today, some advanced users manually set the size of the RWIN. This involves experimenting with different RWIN settings to determine the best setting for their particular connection. Many users, however, do not have the technical expertise to adjust the size of the RWIN. Additionally, if the connection speed changes, the size of the RWIN remains constant unless manually changed.

SUMMARY

The present invention is directed at providing a system and method for automatically tuning the size of a TCP receive window (RWIN).

According to one aspect of the invention, the method for automatic tuning of the TCP RWIN size is based on the bandwidth or throughput of a network connection.

According to another aspect of the invention, the size of the RWIN is selected from a table based on the speed of the network connection. For network connections slower than 1 Mbps the RWIN is 8 KB. For connections faster than 1 Mbps and slower than 500 Mbps the RWIN is 16 KB. Finally, for network connections faster than 500 Mbps, the RWIN may either be 16 KB or 64 KB.

Still yet another aspect of the invention resets the size of the RWIN when a network connection changes. For example, if a connection changes from 10 Mbps to 1 Gbps the size of RWIN is automatically tuned for the new setting.

These and various other features and advantages, which characterize the present invention, will be apparent from a reading of the following detailed description in conjunction with the associated drawings.

DETAILED DESCRIPTION

The present invention is directed at providing a method and system for automatically tuning the size of a TCP receive window (RWIN). In one embodiment of the invention, RWIN is automatically tuned based on the bandwidth of the communication pipe. The bandwidth of the pipe may be determined by adapter card speed, device characteristics, and the like.

Figure 1:
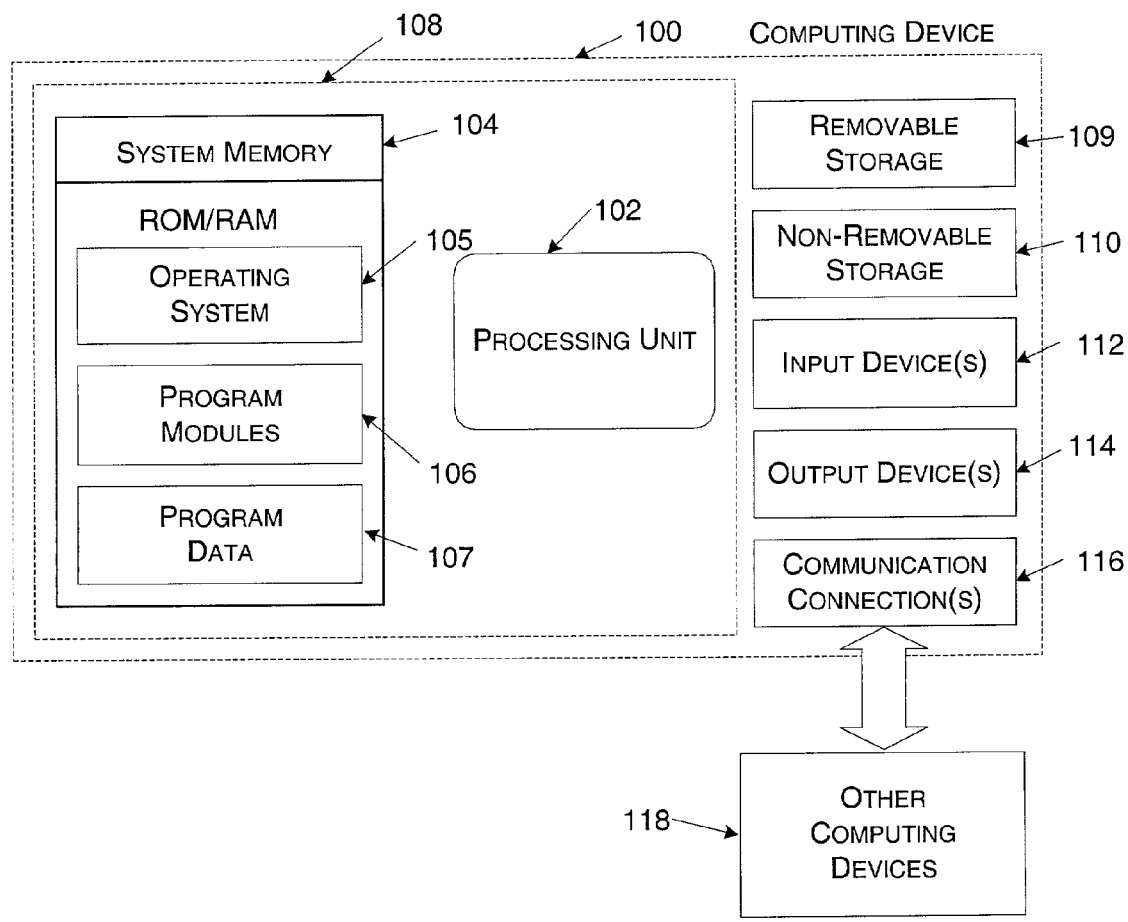
FIG. 1 is a functional block diagram of one computing device adapted to implement one embodiment of the invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
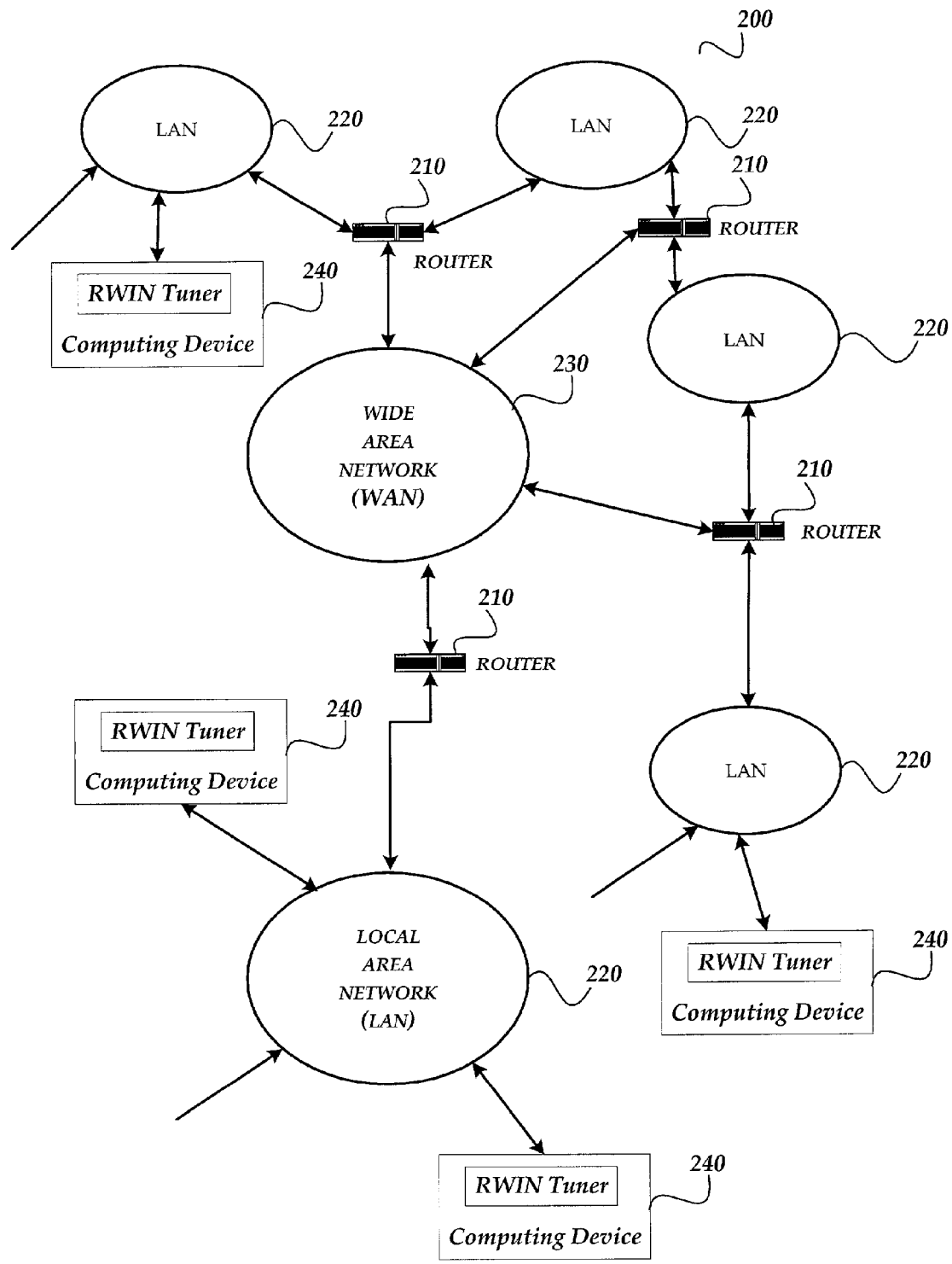
FIG. 2 is a functional block diagram illustrating a portion of the Internet adapted to implement one embodiment of the invention.

FIG. 2 is a functional block diagram illustrating a portion of the Internet (200) adapted to implement one embodiment of the invention;

Routers 210 interconnect a plurality of local area networks ("LANs") 220 and a wide area network ("WAN") 230. Routers 210 are intermediary devices on a communications network that expedite message delivery. On a single network, a router receives transmitted messages and forwards them to their correct destinations over available routes. On an interconnected set of LANs—including those based on differing architectures and protocols—using the same communications protocols, a router acts as a link between LANs, enabling messages to be sent from one to another. Generally, however, the Transmission Control Protocol/Internet Protocol (TCP/IP) is used for communicating on the Internet. Communication links within the LANs are typically twisted wire pair, or coaxial cable, while communication links between networks may utilize 56 Kbps analog telephone lines, 1 Mbps digital T-1 lines, 45 Mbps T-3 lines, wireless links, or other communications links known to those skilled in the art. Furthermore, computers, such as computing device 240, and other related electronic devices can be remotely connected to either LANs 220 or WAN 230 via a modem and temporary telephone link. Computing device 240 contains a receive window (RWIN) tuner that automatically tunes the size of the RWIN. It will be appreciated that Internet 200 comprises a vast number of such interconnected networks, computers, and routers and that only a small, representative section of the Internet is shown in FIG. 2.

Each router 210 can route packets up to the size of a Maximum Transmission Unit (MTU). If router 210 receives a packet larger than an MTU, then router 210 fragments the received packet into packets smaller than an MTU before sending the packet on the network. This fragmentation may be repeated by other routers 210 on the network depending on the MTU of the particular router. Generally, the MTU is set such that it does not exceed the MTU of the Information Service Provider (ISP). If the MTU is larger than the MTU of the ISP then packets will be fragmented since the ISP is always between the sender and receiver. Therefore, the smallest MTU on the path between the sender and receiver directly affects transmission speed.

Figure 3:
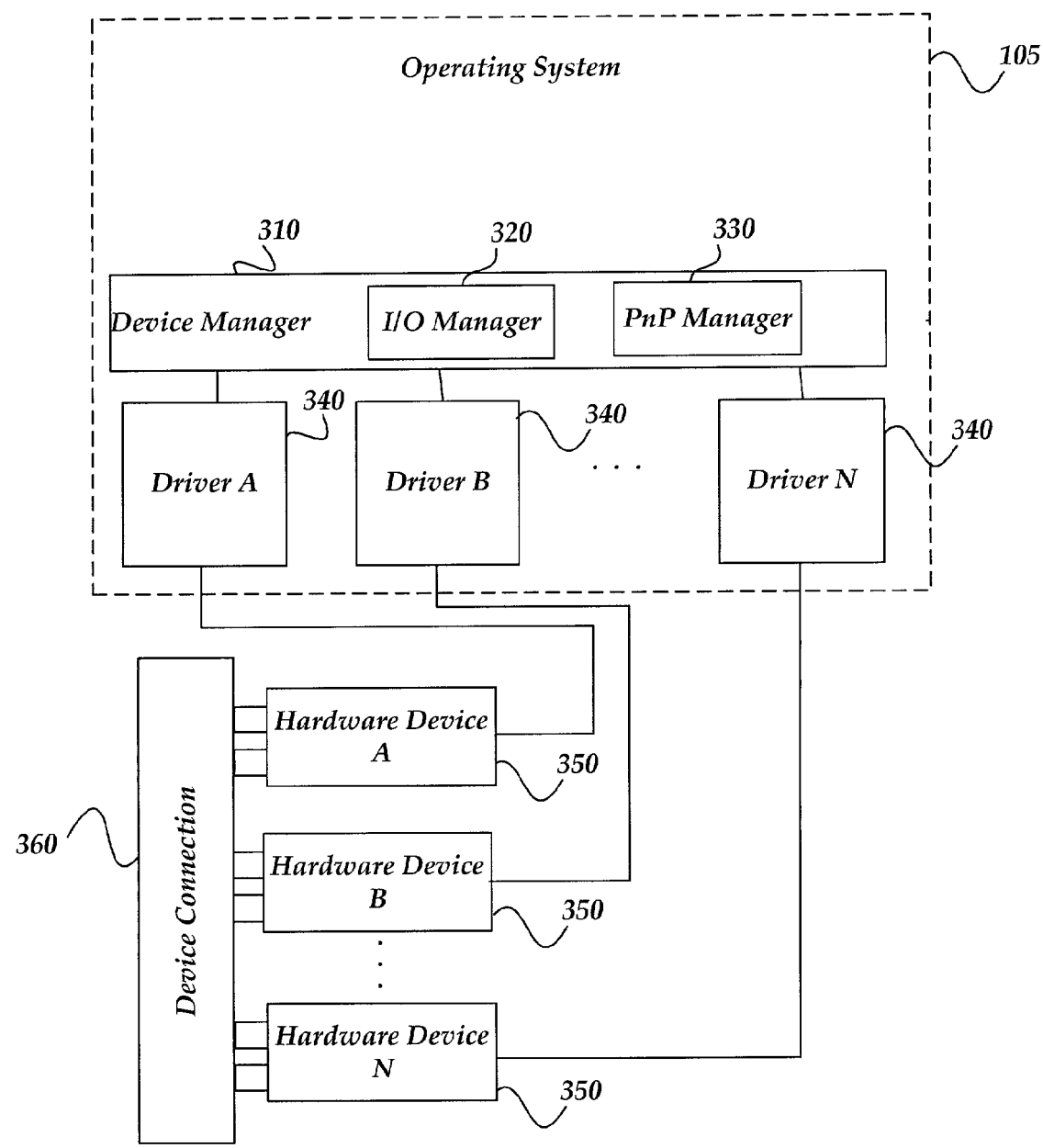
FIG. 3 is a functional block diagram illustrating interaction between an operating system and hardware devices, according to one embodiment of the invention.

FIG. 3 is a functional block diagram illustrating interaction between an operating system and hardware devices according to one embodiment of the invention. A device manager (310) manages the devices connected to a computing device and interacts with an I/O manager 320 and Plug and Play (PnP) manager 330. I/O manager 320 connects applications and system components to devices and defines the infrastructure supporting the devices. PnP manager 330 interacts with I/O manager 320 to implement the allocation of hardware devices as well as to detect and respond to additions and removal of hardware devices.

PnP manager 330 manages hardware resource allocations and reconfigures resource assignments when devices are added/removed to the computing device, and when a device requests resources already in use. In a PnP system, the drivers do not assign their own resources. Instead, PnP manager 330 assigns the appropriate hardware resources, such as the I/O ports, interrupt requests (IRQs), direct memory access (DMA) channels, and memory locations. The appropriate drivers 340 are then loaded to support a particular device.

When PnP manager 330 detects a change in a device the appropriate driver (340) is loaded by computing device 100. Device drivers 340 provide I/O interfaces for devices connected to computing device 100. Generally, hardware device drivers manipulate the physical hardware to write output to or retrieve input from a physical device or network. Device drivers 340 also receive commands routed by I/O manager 320. The device drivers (340) inform I/O manager 320 to forward I/O commands to other devices that share in the implementation of a device's interface or control. According to one embodiment of the invention, the device manager 310, I/O manager 320, PnP manager 330, and drivers 340, are parts of operating system 105 (FIG. 1).

Connected to a computing device are several hardware devices 350, such as network adapters. The hardware devices (350) connect to the computing device through a device connection 360 as is known by those skilled in the art. Each hardware device 350 has at least one associated driver 340. As will be appreciated by those of ordinary skill in the art, there are thousands of hardware devices available for communicating on a network. A hardware layer (not shown) may be implemented to insulate drivers 340 from the specifics of the particular processor and interrupt controller by providing APIs that abstract the differences between different computing devices.

Figure 4:
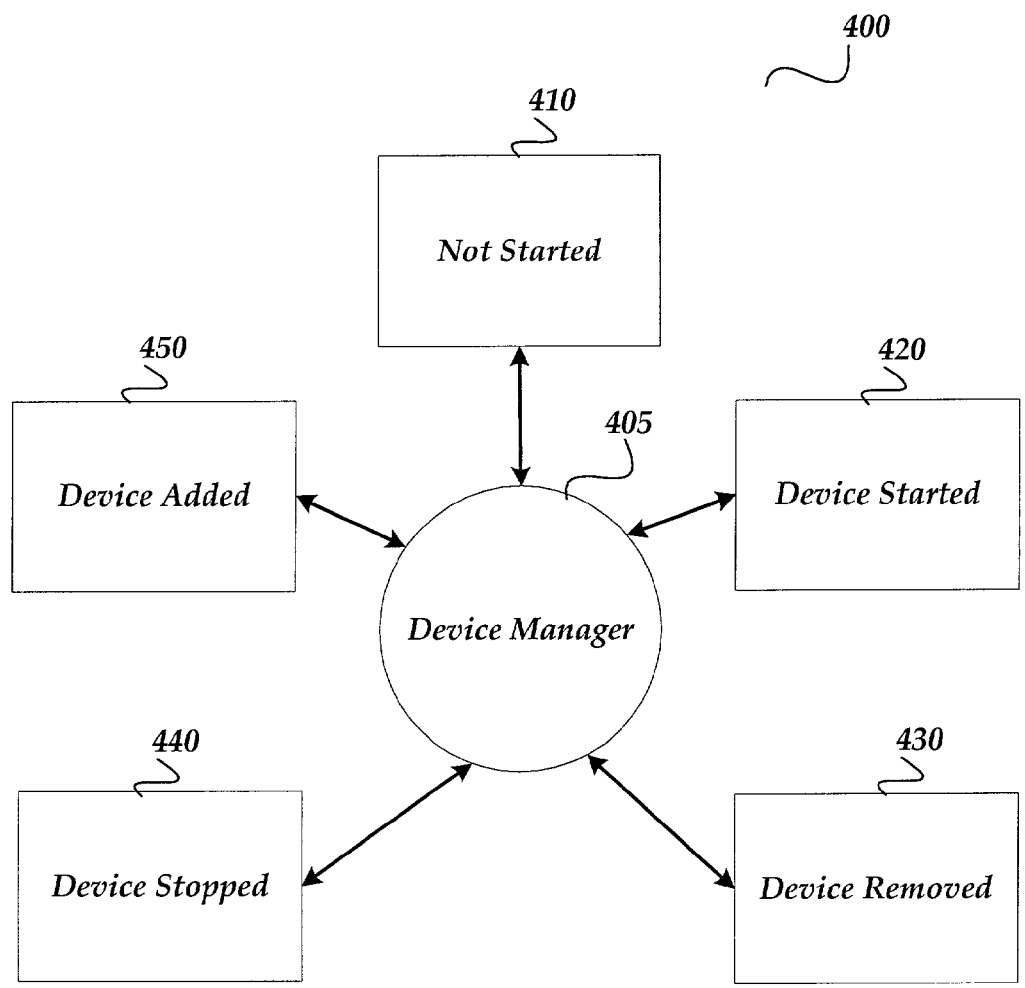
FIG. 4 illustrates a functional hardware device diagram according to one embodiment of the present invention.

FIG. 4 illustrates a functional hardware device manager diagram (400) according to one embodiment of the present invention. Device manager 405 controls starting and stopping devices as well as adding and removing devices from the computing device. According to one embodiment, device manager 405 is a PnP manager.

PnP enables a computer system to automatically recognize hardware configuration changes and configure the attached devices with little or no user intervention. A PnP system recognizes if devises are not started (410), devices are added (450), devices are removed (430), devices are started (420), and devices are stopped (440). PnP systems may also monitor connections to a network without restarting the system or adjusting configuration parameters.

PnP systems allow network adapters to be installed and start working without having to manually configure the network adapters. Additionally, an adapter can be unbound from one protocol driver and subsequently rebound without having to remove the adapter from the computing device. For example, if a PCMCIA network adapter is removed from a computing device the appropriate device driver(s) are notified.

A computing device implementing a PnP system determines the configuration, and applications automatically adjust to the new configuration. Many operating systems support Plug and Play, including Windows 95, Windows 2000, Windows ME, as well as many versions of the Unix operating system. By using appropriate drivers, operating systems support a wide range of network media, including Ethernet, token ring, and ArcNet®.

Devices that are not auto-detected may still be used in devices using PnP. For these devices, once the device is installed the operating system knows the device installed. Based on a characteristic of the device installed, the system can determine the connection speed of the device. For example, if the name of the device is 56K_Modem then the operating system may assume that the device operates at 56 K. In another embodiment, a table is maintained containing the name of the connection device along with the speed of the connection device.

Figure 5:
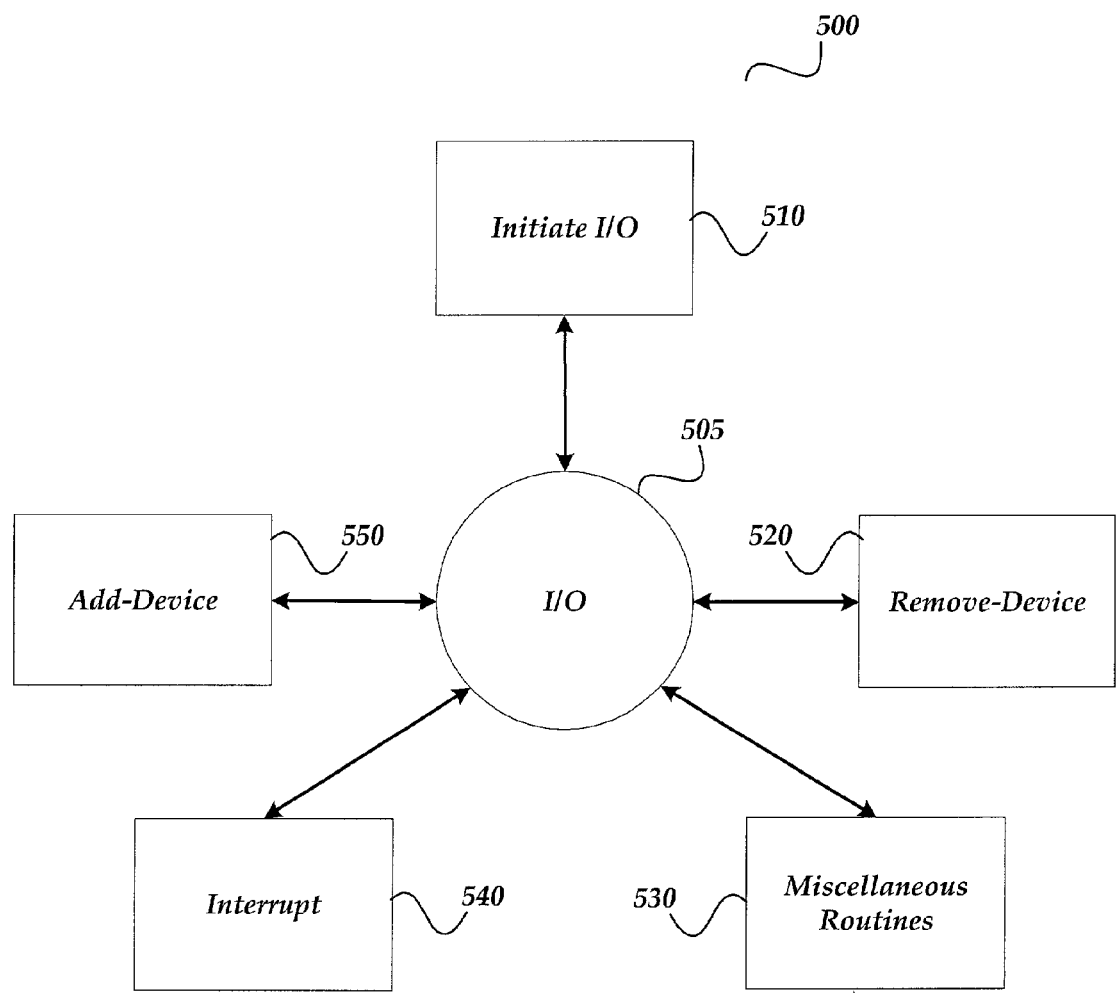
FIG. 5 illustrates an I/O system driving a set of exemplary device drivers, according to one embodiment of the invention.

FIG. 5 illustrates an I/O system (500) containing a set of exemplary device drivers. Generally, device drivers consist of routines that are executed at various stages of an I/O request. Starting at I/O routine 505, an initiate I/O routine (510) is provided. The initialization routine loads the device driver into operating system 105. During the initialization routine the routines associated with the device driver are registered with the I/O system.

Remove-device routine 520 is invoked when a device is removed. According to one embodiment of the invention, devices, such as a network connection device, are monitored. Similarly, add-device 550 is processed when a device is added to the system. The device may be added before the operating system is running, or during operation. According to one embodiment of the invention, whenever a PnP device is added to the system, the driver associated with the device sends a notification and the PnP manager creates a device object representing the device.

Routines 530 illustrate the miscellaneous routines available to the device driver. Generally, these routines include open, close, read/write, device identification information and other capabilities that the device supports. Other routines may include: completion routines, cancel routines, unload routines, system shutdown, error-logging and the like may be implemented.

Routine 540 illustrates an interrupt routine according to an embodiment of the invention. When a device interrupts, the operating system transfers control to the interrupt routine. Various levels of interrupt routines may be provided. For example, interrupts may have levels of interrupts associated based on the urgency. An interrupt routine could also be provided that is processed when a network connection changes.

FIGS. 6-7 illustrate data flow through pipes. Generally, throughput of a pipe used for TCP communications is limited by the bandwidth of the slowest segment of a pipe. For a predefined RWIN, the throughput of a pipe is also limited by the total roundtrip time delay between the source and destination (RTT). The throughput can be further limited by the errors in the pipe such as corrupted or dropped packets.

The time to send data generally depends on the propagation delay caused by latencies in the hardware and transmission delays caused by the transmission speed of the communication hardware. The effect of the propagation delay and transmission delay on the capacity of the pipe is directly proportional to the speed of the transmission. At higher speeds, propagation delays are a major factor, whereas, at lower speeds, the transmission delay is the major factor.

Figure 6A:
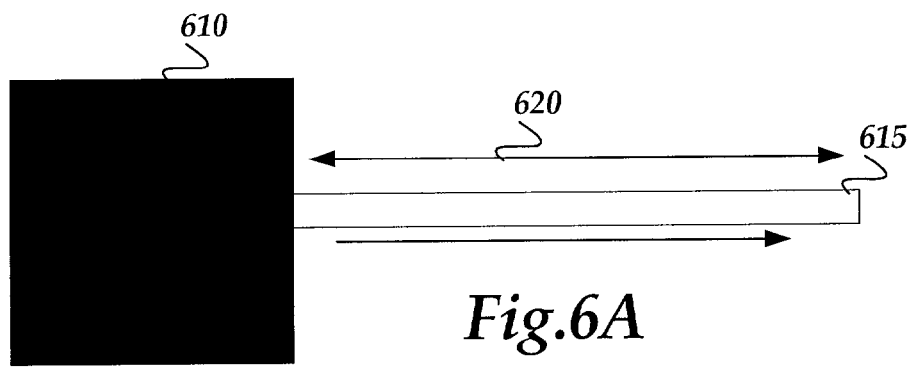
FIGS. 6A-6B illustrate data moving from a larger pipe into a smaller pipe.
Figure 6B:
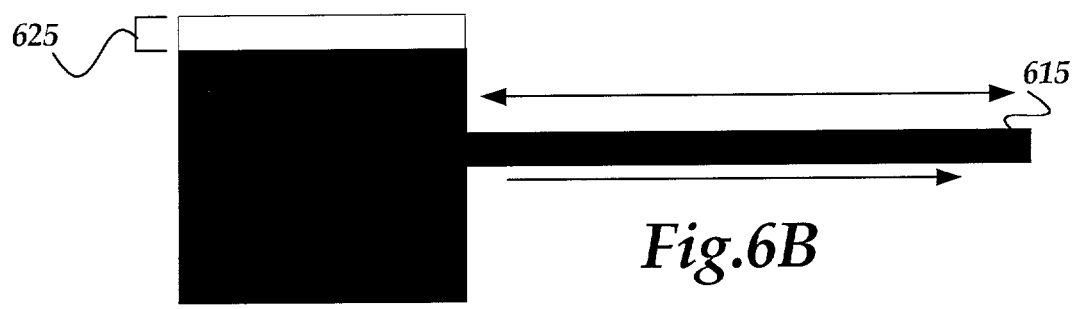

FIGS. 6A-6B illustrate a bottleneck caused by data from a larger capacity pipe flowing into a smaller capacity pipe. Data 610 in the larger pipe are sent through smaller pipe 615 creating a congestion problem. This situation may occur many times while data is transmitted throughout the Internet. For example, if a host is connected to a LAN, and a router connects the LAN to a WAN that is slower, then the router may be the point of congestion. Data 610 is delayed from being delivered until smaller pipe 615 can handle more data from the larger pipe.

FIG. 6B illustrates a portion of data from the larger pipe sent through a smaller pipe. In this particular example, smaller pipe 615 is filled with data while the larger pipe is substantially filled. Data in smaller pipe 615 creates room 625 for more data in the larger pipe. The relative sizes of the pipes are one factor determining the severity of the congestion problem.

Figure 7A:
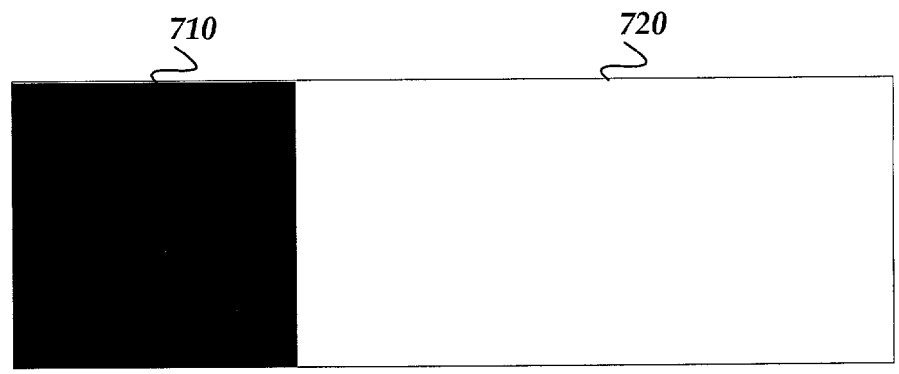
FIGS. 7A-7B illustrate data moving within a constant sized pipe.
Figure 7B:
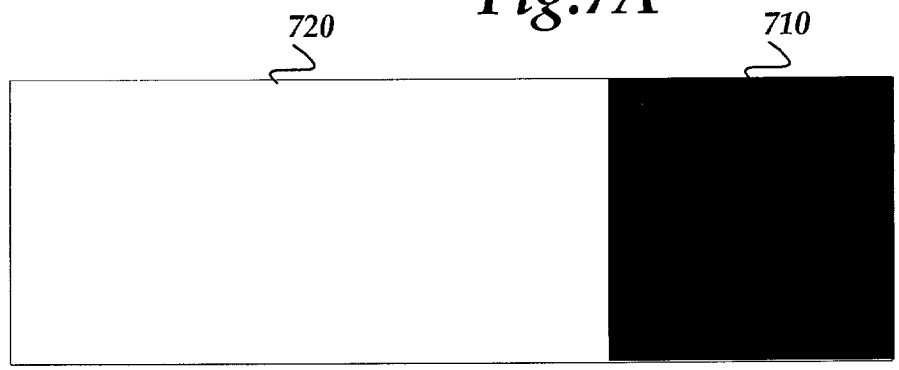

FIGS. 7A-7B are diagrams illustrating data flow within a constant sized pipe. A block of data 710 may be transferred through pipe 720 without any congestion. In this particular example, data 710 may be sent in one packet. FIG. 7B illustrates data sent through a pipe. Data 710 is at the receive end after one send.

Figure 8A:
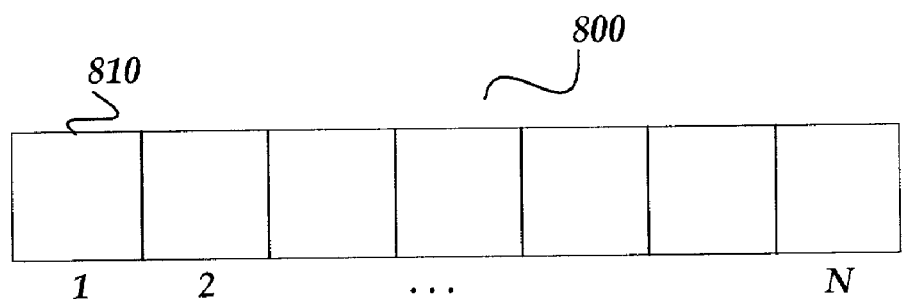
FIGS. 8A-8B illustrate a RWIN, according to one embodiment of the invention.
Figure 8B:
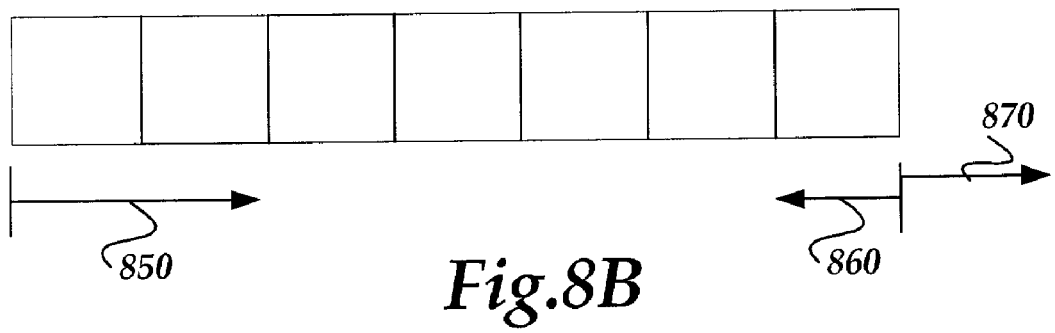

FIGS. 8A-8B show a receive window (800) according to one embodiment of the invention. RWIN 800 has a size for storing data sent by a sender. The data may be bits, bytes, segments, and the like. According to one particular embodiment, RWIN 800 has N data segments 810 of a particular size. It will be appreciated that RWIN 800 may be one continuous block of data and does not need to be segmented.

FIG. 8B illustrates the effective movement of RWIN edges according to one embodiment of the invention. RWIN 800 is set to receive N segments 810. A receiver of data advertises its RWIN size during TCP/IP connection setup. The sender may then send as many packets as allowed by the size of the RWIN before receiving an acknowledgement (ACK). In other words, each segment sent by the sender closes RWIN by one segment (indicator 860) and each ACK received opens the window (indicator 870). On a TCP connection, a sender may transmit the number of segments advertised by RWIN 800 before waiting for an ACK. In this particular example, RWIN 800 is sized at N segments. Preferably, RWIN 800 is sized as to maximize throughput of the of the data pipe. As will be appreciated by those of skill in the art, the size of the RWIN also corresponds to the time it takes the computing device to handle other TCP/IP transactions occurring. Therefore, the size of the RWIN can affect the delay a user experiences.

Figure 9A:
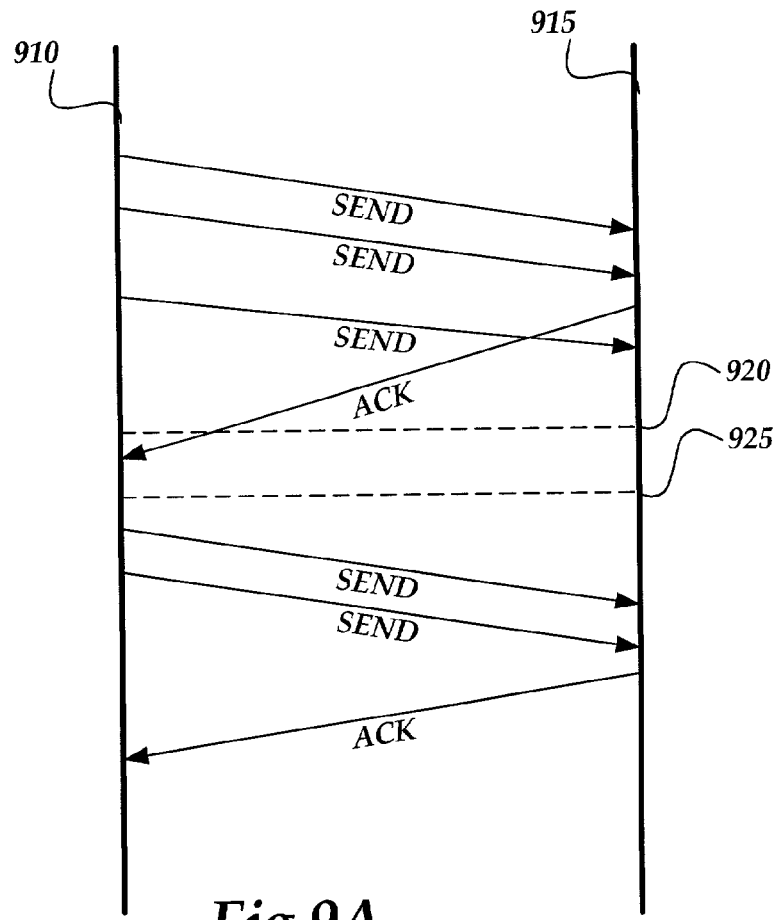
FIGS. 9A-9C illustrate operation of a RWIN, according to one embodiment of the invention.
Figure 9B:
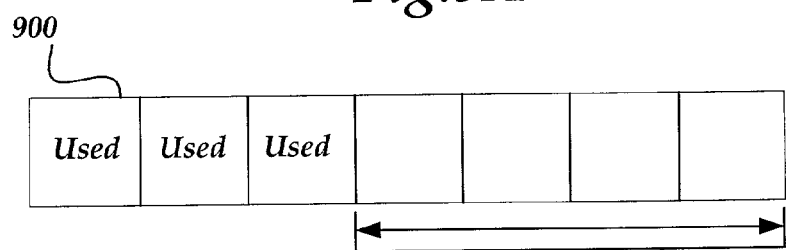
Figure 9C:
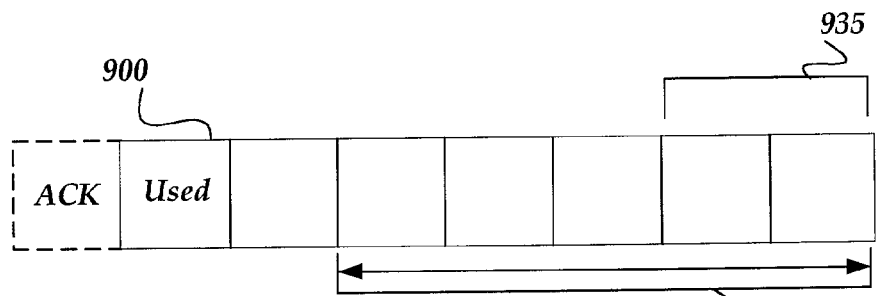

FIGS. 9A-9C are exemplary diagrams illustrating transferring data and the effect on the RWIN. Referring to FIG. 9A, a sender 910 sends data to receiver 915. In this particular example, RWIN is sized at seven segments. Initially, two data segments are sent before the first packet reaches receiver 915 effectively closing the effective size of RWIN 900. This can result in more packets being sent by the sender before receiving an ACK. Even if receiver 915 were to send ACK immediately, it takes some more time for the ACK packet reach sender 910. Data is continually sent in the above manner until the connection is terminated. At some points during the connection, receiver 915 may ACK each segment, or at times an ACK may not be sent until RWIN 900 is full.

FIG. 9B illustrates a RWIN closing. Referring to FIG. 9A at point 920 after sender 910 has sent three segments, but before sender 910 has received an ACK, RWIN has used three of the available seven segments. Sender 910 may continue filling the remaining space 930 of RWIN 900 without receiving an ACK.

FIG. 9C illustrates a receive window opening up after receiving an acknowledgement. When sender 910 receives an ACK, sender 910 may send data to fill up RWIN 900 before waiting for another ACK. The amount of data that may be sent depends upon when during the sequence of sends the ACK was sent. Referring to FIG. 9A, an ACK was sent after two send commands effectively opening up two more segments 935 of RWIN 900 for sender 910 to send data.

Figure 10:
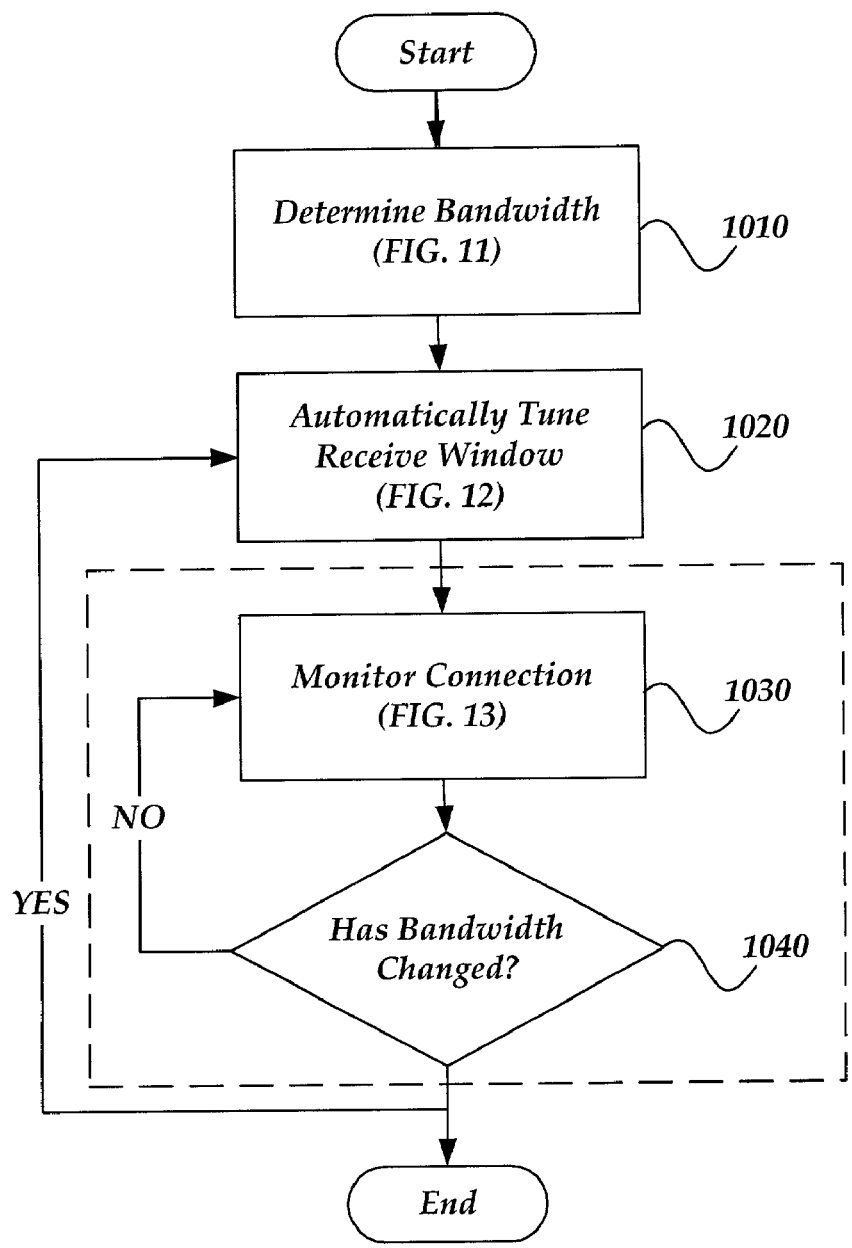
FIG. 10 is an overview flowchart illustrating automatically tuning a RWIN, according to embodiments of the invention.

FIG. 10 is an overview flowchart illustrating automatically tuning a receive window according to embodiments of the invention. Starting at block 1010, the bandwidth of a communication connection is determined (See FIG. 11 and related discussion). Proceeding to block 1020, the RWIN is automatically tuned (See FIG. 12 and related discussion). The connection information obtained at block 1010 is used to help determine the size of the RWIN. According to one embodiment of the invention, the logical flow ends at this point.

Figure 13:
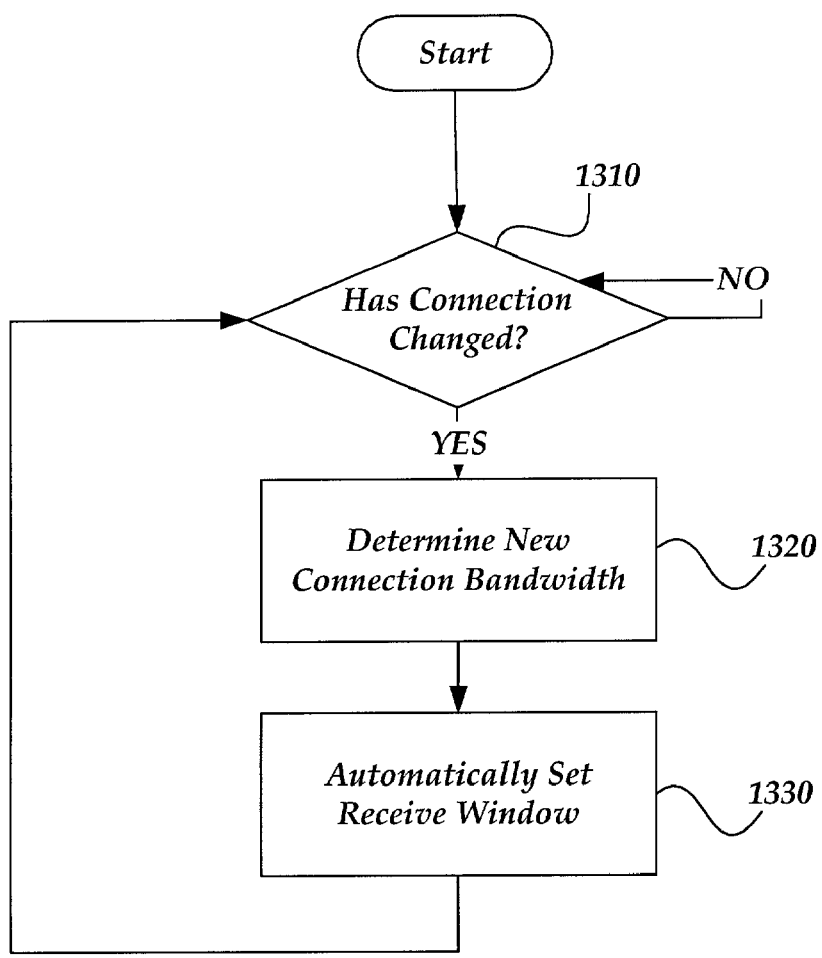
FIG. 13 is a flowchart illustrating monitoring connections, according to an embodiment of the invention.

According to another embodiment of the present invention, at block 1030, communication connections are monitored (See FIG. 13 and related discussion). Connections are monitored to determine if any of the current connection conditions have changed. Decision block 1040 determines if a connection bandwidth has changed. If so, the RWIN may be automatically set based on the new connection information. The RWIN is tuned for the new connection speed if the current RWIN is not properly tuned to the new connection speed. According to another embodiment of the invention, RWIN is tuned whenever a connection changes. The flow returns to block 1030 to continue monitoring the connection information if the connection information has not changed.

Figure 11:
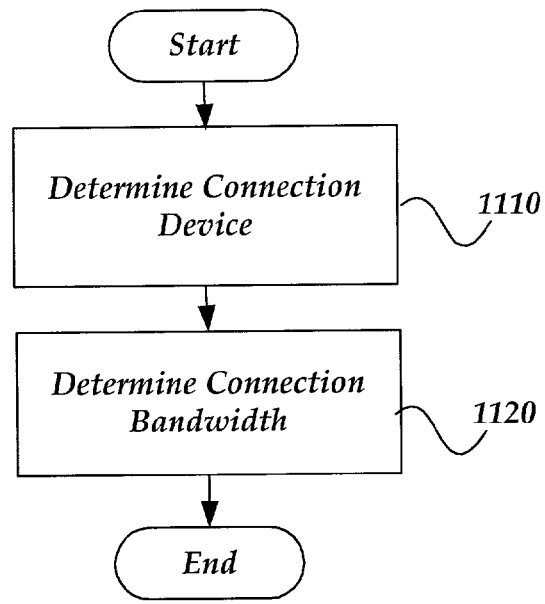
FIG. 11 is a flowchart illustrating determining bandwidth of a connection, according to an embodiment of the invention.

FIG. 11 is a flowchart illustrating determining connection information according to one embodiment of the invention. Starting at block 1110, the connection device associated with the RWIN to tune is determined. This information may be determined in many different ways. For example, a PnP manager may inform the program of any connection devices, the system may be polled to determine any devices, a list may be stored containing the installed devices, and the like.

At block 1120 the bandwidth of the connection is determined. According to one embodiment of the invention, attributes are provided to the tuner by a device driver. In another embodiment, the attribute(s) is obtained from the name of the device. For example, if the name of the device is 10/100 Ethernet Card then an assumption may be made that the device has a bandwidth of at least 10 Mbps and as high as 100 Mbps. Additionally, a list of devices and their bandwidth may be stored on the system. As is appreciated by those of ordinary skill in the art, this bandwidth information is readily available from the computing device. The logical flow returns at this point.

Figure 12:
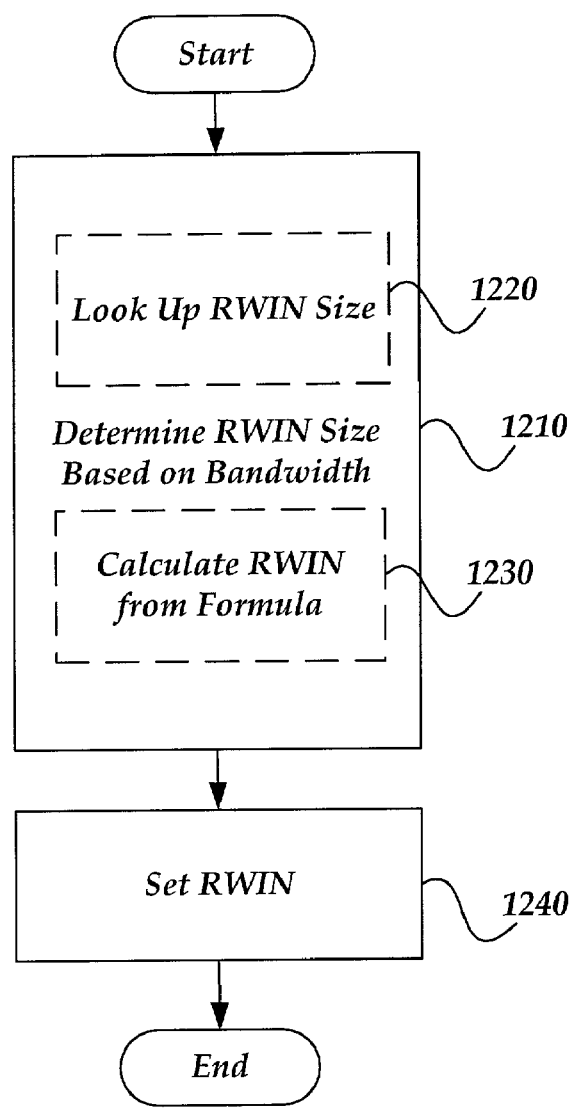
FIG. 12 is a flowchart illustrating ways of automatically setting a RWIN, according to embodiments of the invention.

FIG. 12 is a flowchart illustrating automatically tuning the RWIN according to embodiments of the invention. Starting at block 1210, the size of RWIN is determined based on the determined bandwidth of the connection device. According to one particular embodiment, the size of the RWIN is determined by looking up the size in a table (block 1220). For example, Table 1 is an exemplary example of such a table.

TABLE 1

| Bandwidth Mbps | TCP Receive Window Size (RWIN), KB | | |
| --- | --- | --- | --- |
| | Win95/98, NT 4.0 | Windows 2000 | Whistler |
| 1 and below | 8 KB | 8 KB | 8 KB |
| 1 to 500 | 8 KB | 16 KB | 16 KB |
| 500 and above | 8 KB | 16 KB | 64 KB |

The size of the RWIN is set to 8 KB if the determined bandwidth is 1 Mbps and below. Between 1 Mbps and 500 Mbps the size of the RWIN is set to 8 KB or 16 KB. For connections above 500 Mbps the RWIN size is set to 8 KB, 16 KB, or 64 KB depending on the particular operating system.

Experimenting with different RWIN sizes to find settings on different operating systems for a typical user's connections generated Table 1. Making the size of the RWIN too large may reduce throughput especially on a line experiencing packet loss. When the pipe is experiencing significant packet loss RWIN may need to be reduced even further. This is because smaller RWIN size allows for faster recovery of lost packets. It will be appreciated that other sizes can be used within the table, as well as expanding the table to include many more bandwidths.

Similar lookup tables may be set for other operating systems. The size information may be stored in any data structure sized to store the information. For example, the information may be stored in an array, linked list, a file on the system, and the like.

In another embodiment of the invention, the size of the RWIN is determined by a formula (block 1230). As is known to those skilled in the art there are many formulas for setting the size of the RWIN. On LAN links RTT is small. Therefore, a small RWIN is generally sufficient. However, the same RWIN would probably be insufficient on WAN links. As will be appreciated by those of ordinary skill in the art, delay may vary for each connection as well as during the lifetime of a particular connection. This can result from data following different routes or load changes at a router. Additionally, RTT may change significantly depending on where the data travels. For example, if a connection is between North America and Australia, the RTT may be much higher than if the connection is within North America. Additionally, if an Internet service provider (ISP) only uses low speed Internet access then RTT may increase. Pinging the receiver may make a rough determination of RTT.

The size of the RWIN is then set using the determined values (block 1240). According to one embodiment, the registry is updated reflecting the new value for the size of the RWIN.

FIG. 13 is a flowchart illustrating monitoring connections according to an embodiment of the invention. Decision block 1310 determines if a connection has changed. In one embodiment, a PnP manager monitors the connection (FIG. 5). In the Windows 2000K operating system, processes may be informed if a network connection is unplugged or plugged from the system. Additionally, if a hardware card is added, removed, stopped, started, the system can inform the interested processes. According to one embodiment, if a user unplugs a 10 Mbps cable from the adapter card and plugs in a 100 Mbps cable the system will know of this change and RWIN can be set. If a status of a connection changes, the new bandwidth is determined from which the size of the RWIN may be set.

If the connection has changed, the logical flow moves to block 1320 where the new connection bandwidth is determined and the size of the RWIN is set based on the new bandwidth (block 1330). If the connection has not changed, the logical flow remains at decision block 1310.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for automatically tuning a size of a TCP receive window on a receiving computing device, comprising:
   automatically determining a bandwidth of a network connection of a receiving computing device on the receiving computing device; and
   automatically tuning the size of the TCP receive window on the receiving computing device based on the determined bandwidth; wherein the automatically tuning comprises setting the size of the current TCP receive window directly on the receiving computing device by the receiving computing device without manual intervention and wherein setting the size of the current TCP receive window sets the number of packets allowed to be sent from a sending computer device to the receiving computing device before an acknowledgment is sent from the receiving computing device to the sending computing device; wherein setting the size of the TCP receive window includes setting a value that is stored on the receiving computing device that is referenced for each TCP connection setup; wherein the value setting the receiving computing device is different from a parameter within a TCP packet that indicates the size of the TCP receive window on the receiving computing device.

2. The method of claim 1, wherein determining the bandwidth of the network connection, further comprises:
   obtaining at least one attribute of a network connection device; and
   determining the bandwidth of the network connection from the at least one obtained attribute.

3. The method of claim 2, wherein automatically tuning the size of the TCP receive window based on the determined bandwidth further comprises:
   determining the size of the TCP receive window based on the determined bandwidth; and
   setting the size of the TCP receive window to the determined size.

4. The method of claim 3, wherein determining the size of the TCP receive window based on the determined bandwidth further comprises accessing the size of the TCP receive window from a look-up table, wherein the look-up table includes at least three different sizes from which the size of the TCP receive window is selected.

5. The method of claim 2, wherein determining the at least one attribute of the network connection device further comprises determining a speed of the network connection device or a name of the network connection device.

6. The method of claim 2, wherein the at least one attribute is a name of a network connection device.

7. The method of claim 1, further comprising:
   monitoring the network connection to determine if the network connection has changed; and
   tuning the size of the TCP receive window if the network connection has changed.

8. The method of claim 1, wherein automatically tuning the size of the TCP receive window based on the determined bandwidth further comprises determining the size of the TCP receive window from a look-up table based on the determined bandwidth; wherein the look-up table includes at least three different sizes from which the size of the TCP receive window is selected.

9. The method of claim 1, wherein automatically tuning the size of the TCP receive window based on the determined bandwidth further comprises determining a current operating system and setting the size of the TCP receive window based on the determined bandwidth and the operating system.

10. A computer-readable medium having computer-executable instructions for automatically tuning a size of a TCP receive window on a receiving computing device, comprising:
    determining a network connection device on the receiving computing device;
    determining a throughput of the network connection device of the receiving computing device; wherein the receiving computing device is a user device;
    determining a size to set the TCP receive window based on the determined throughput by accessing a data structure and extracting the size from the data structure based on the determined throughput; wherein the data structure is segmented based on bandwidth of a connection device; wherein the data structure includes at least three different sizes to set the TCP receive window; and wherein the data structure includes sizes to set the TCP receive window for at least three different operating system;
    automatically tuning the size of the TCP receive window directly on the receiving computing device by the receiving computing device based on the determined throughput of the connection by setting the size of the TCP receive window automatically without manual intervention and wherein setting the size of the TCP receive window sets the number of packets allowed to be sent from a sending computer device to the receiving computing device before an acknowledgment is sent from the receiving computing device to the sending computing device; wherein setting the size is performed by the receiving computing device and involves setting a value within a configuration database that is accessed by the operating system of the receiving computing device; wherein the value for the TCP receive window is referenced when a TCP connection is setup; wherein the value is different from a parameter within a TCP packet that indicates the size of the TCP receive window on the receiving computing device; and determining when the network connection has changed by monitoring a connection of network hardware that is associated with the network connection and when the network connection changes automatically tuning the size of the TCP receive window.

11. The computer-readable medium of claim 10, further comprising:

monitoring the throughput of the connection to determine if the throughput of the connection has changed; and automatically tuning the size of the TCP receive window if the throughput of the connection has changed.

12. The computer-readable medium of claim 11, wherein determining the throughput of the connection, further comprises:

polling a network connection device for at least one attribute; and receiving the at least one attribute from the network connection device; and determining the throughput of the connection from the at least one received attribute.

13. The computer-readable medium of claim 12, wherein automatically tuning the size of the TCP receive window based on the determined throughput further comprises:

looking up the size of the TCP receive window based on the determined throughput, and setting the size of the TCP receive window to the looked up size.

14. The computer-readable medium of claim 10, wherein tuning the size of the TCP receive window based on the determined throughput of the connection comprises sizing the TCP receive window based on a type of network connection device.

15. An apparatus for automatically tuning a size of a receive window, comprising:

a processor and a computer-readable medium;

an operating environment stored on the computer-readable medium and executing on the processor;

a network connection device operating under the control of the operating environment; and an automatic tuning device operating under the control of the operating environment and operative to perform actions, including:

determining a bandwidth of the network connection; and setting the size of the receive window based on the determined bandwidth without manual intervention and wherein setting the size of the receive window sets the number of packets allowed to be sent from a sending computer device to the apparatus before an acknowledgment is sent from the apparatus to the sending computing device; wherein setting the size is performed by the receiving computing device and involves adjusting a value that is maintained on the receiving computing device.

16. The apparatus of claim 15, wherein determining the bandwidth of the network connection device, further comprises:

obtaining at least one attribute of the network connection device; and determining the bandwidth of the network connection device from the at least one attribute.

17. The apparatus of claim 16, wherein obtaining the at least one attribute of the network connection device further comprises determining a speed of the network connection device or a name of the network connection device.

18. The apparatus of claim 17, further comprising:

monitoring the network connection device to determine if the network connection device has changed; and tuning the size of the receive window if the network connection device has changed.

19. The apparatus of claim 15, wherein automatically tuning the size of the TCP receive window based on the determined bandwidth further comprises determining the size of the TCP receive window by accessing a look-up table based on the determined bandwidth.

20. The apparatus of claim 15, wherein automatically tuning the size of the TCP receive window based on the determined bandwidth further comprises determining a version of the operating environment executing on the processor and setting the size of the TCP receive window based on the determined bandwidth and the operating environment.

* * * * *